Patented July 18, 1944

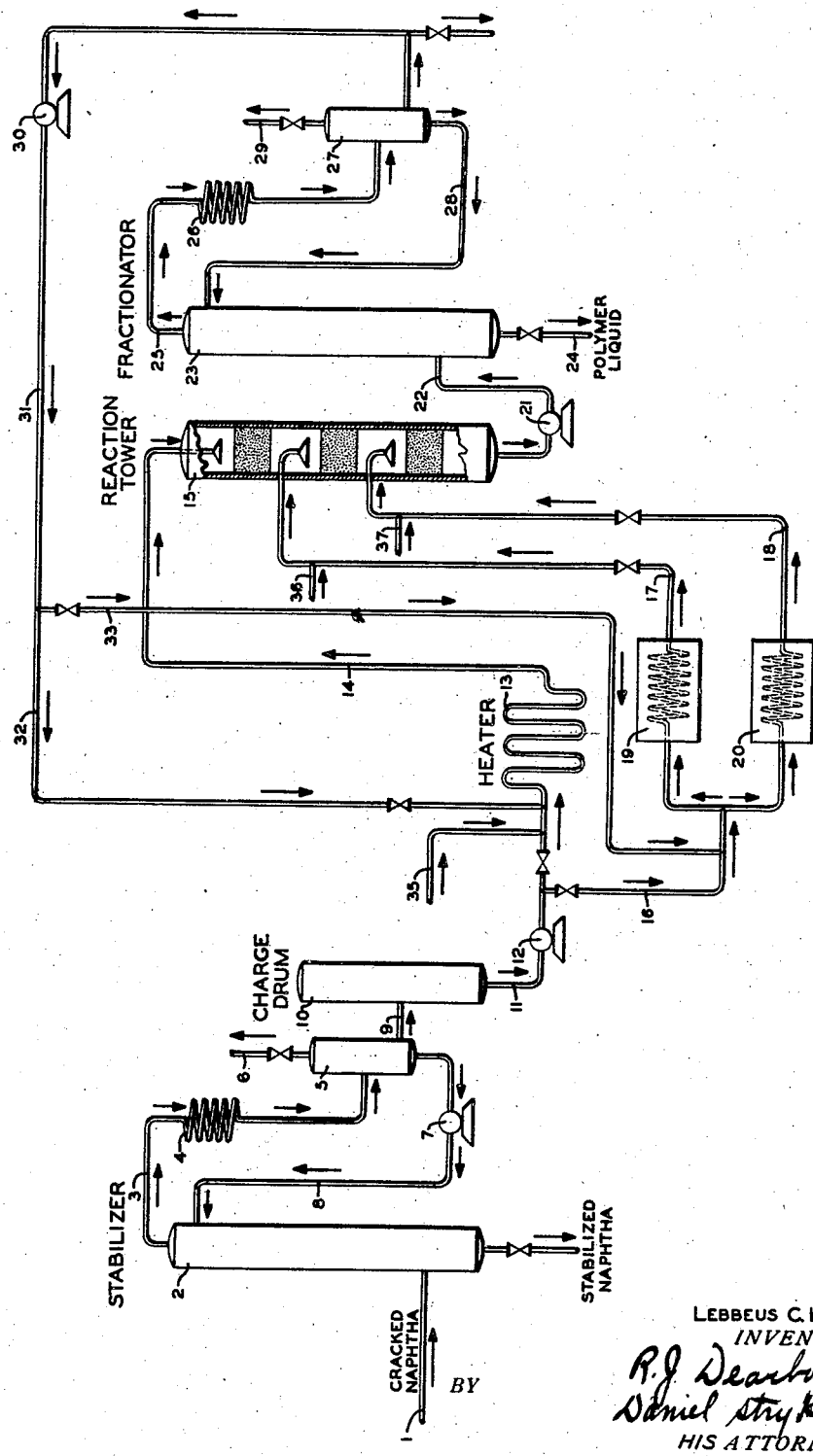

2,353,832

UNITED STATES PATENT OFFICE 2,353,832

CATALYTIC CONVERSION OF HYDROCARBONS

Lebbeus C. Kemp, Fishkill, N. Y., assignor, by mesne assignments, to The Texas Company, New York, N. Y., a corporation of Delaware Original application July 13, 1939, Serial No. 284,192. Divided and this application October 31, 1940, Serial No. 363,589

3 Claims. (Cl. 260—683.15)

This invention relates to the catalytic conversion of unsaturated hydrocarbons, and particularly to the catalytic polymerization of normally gaseous olefin hydrocarbons for the production of liquid polymers suitable for the manufacture of motor fuel.

Broadly, the invention contemplates effecting polymerization of olefin hydrocarbons during passage through a tower or reaction vessel packed with the catalyst in solid lump or granular form, and wherein the hydrocarbon feed is introduced to the vessel at successive points so as to maintain optimum operating conditions within the vessel.

More specifically, the catalytic treatment is effected in a tower packed with a catalyst such as phosphoric acid and having the catalyst arranged in a plurality of beds spaced a short distance apart vertically within the vessel. A large portion of the hydrocarbon feed is heated to approximately, or a few degrees below, the reaction temperature, for example, to a temperature of around 375 to 400° F. The heated hydrocarbons are introduced to one end of the vessel, preferably near the top, and caused to flow downwardly within the vessel through the beds of catalyst in succession. Smaller portions of the hydrocarbon feed in an unheated condition, or at temperatures substantially below the temperature of the hydrocarbons entering the top of the vessel, are introduced at intermediate points between successive beds of the catalyst.

The proportion of hydrocarbon feed introduced at successive points is of such volume and at such temperature as to control, or, if necessary, inhibit substantial rise in the temperature throughout the catalyst mass and which rise is due to the exothermic character of the reaction.

Introduction of the fresh feed at successive points makes up for the reduction in volume of the gas or mixed gas and liquid hydrocarbons during passage through the mass and which is the result of polymerization of its constituents. This is particularly desirable where the feed hydrocarbons are rich in olefins or polymerizable constituents. Otherwise, the reduction in volume is quite substantial.

The invention thus contemplates maintaining a substantially uniform velocity of hydrocarbons through all portions of the catalytic mass. This may be accomplished by multiple injection of the feed hydrocarbons. Also it is contemplated that this may be accomplished, all or in part, by the multiple injection to the reaction vessel of recycled hydrocarbons; that is, the gaseous or low-boiling hydrocarbons leaving the process and which have not been converted or have undergone incomplete conversion.

When employing multiple injection of the feed hydrocarbons and where the catalyst comprises phosphoric acid, it may be desirable to adjust or vary the water content of the hydrocarbons entering at each point of injection so as to regulate the water content of the catalyst.

An important object of the invention is to maintain uniform temperature control throughout the catalyst mass. It is desirable to maintain the temperature of the mass within the range of about 380° F. to not in excess of about 475° F. Since the reaction is exothermic there is a marked tendency for the temperature of the mass to increase substantially above the aforesaid temperatures. Higher temperatures, however, are objectionable, not only on account of the tendency to form liquid polymers of higher boiling point than desired, but also on account of the tendency to deposit a large amount of carbon or carbonaceous matter upon the catalyst.

The operating temperature at which maximum olefin conversion is obtained without excessive carbon deposition will vary with the olefin content of the gas. With a gas containing 40% of olefins a temperature as high as 380° F. may be permitted, while with a gas containing 20% of olefins the temperature may be as high as 450° F.

As the gaseous feed hydrocarbons pass downwardly through the catalyst bed there is a progressive reduction in olefin content, due to conversion to polymers, so that the temperature may be gradually increased towards the bottom of the bed for maximum conversion without excessive carbon deposition.

The invention therefore contemplates operating with a temperature gradient throughout the catalyst tower and controlling the degree of this gradient by introduction of a portion of the cool fresh feed, or cooled recycled hydrocarbons, at various intermediate points in the tower. In other words, it is desired to correlate the temperature at succeeding points in the tower with the olefin concentration at such points.

On the other hand, it is undesirable to maintain too low a temperature throughout the reaction mass, since, under such conditions, the catalyst tends to absorb and retain more water from the hydrocarbon feed and which results in softening of the catalyst.

Close control of the temperature of the catalyst mass is also desirable from the standpoint of maintaining the proper equilibrium between the water content of the catalyst and the water content of the gases undergoing treatment. In other words, at lower temperatures the catalyst picks up water, while at higher temperatures water is expelled. It is usually desirable, in the case of a catalyst comprising phosphoric acid, to operate with a concentration of around 100 to 110% $H_3PO_4$ by weight.

Advantageously, therefore, small amounts of water may be introduced at various points in the tower, with the amounts so introduced being correlated with the temperature at the corresponding point within the tower to avoid dehydration or excessive hydration of the catalyst.

In order to describe the invention further reference will now be made to the accompanying drawing showing an arrangement of flow suitable for practicing the method of the invention.

Cracked naphtha, such as produced in the commercial cracking of petroleum, is drawn from a source not shown and passed through a pipe 1 to a stabilizer 2, wherein the normally gaseous hydrocarbons, comprising both saturated and unsaturated hydrocarbons, are removed and withdrawn from the stabilizer through a pipe 3 leading to a condenser 4.

The condenser 4 discharges to a drum 5 in which liquid condensate collects. Uncondensed constituents, comprising fixed gases, may be drawn off through a valved pipe 6. A portion of the condensate is returned by a pump 7 and pipe 8 to the upper portion of the stabilizer 2, and provides a reflux for controlling the extent of fractionation.

The surplus condensate or stabilizer reflux accumulating in the drum 5 is drawn off through a pipe 9 to a drum 10 which provides a supply tank for the subsequent polymerizing operation.

The hydrocarbons accumulating in the drum 10 will comprise a substantial proportion of olefin hydrocarbons. The proportion of olefin hydrocarbons may range from around 20 to 40%, depending upon the nature of the cracked naphtha introduced to the stabilizer 2. These hydrocarbons will comprise $C_4$, $C_3$ and $C_2$ olefins. These hydrocarbons are drawn off through a pipe 11 by a pump 12 and a portion thereof passed through a heater 13, wherein they are heated, under a pressure of around 700 pounds, to a temperature of about 375 to 400° F. The heated hydrocarbons are passed through a pipe 14 to the upper portion of a reaction tower 15.

The tower 15 comprises a vertical vessel packed with a catalyst in lump or granular form and arranged in a series of beds spaced vertically apart within the tower. The catalyst may comprise phosphoric acid suspended or supported upon quartz, pumice or clay, etc. The tower may contain around three or four beds, and each bed may range from about two to eight feet in depth.

As the olefin hydrocarbons pass through the beds in succession they are polymerized to form liquid polymers. As a result of heat evolution during polymerization the temperature of each bed tends to rise.

A portion of the hydrocarbon feed is therefore by-passed around the heater through a pipe 16 and introduced through branch pipes 17 and 18 extending into the interior of the tower in the spaces between the catalyst beds.

As indicated, the hydrocarbons passing through pipes 17 and 18 may be either heated or cooled in heat exchangers 19 and 20, respectively, so as to control more closely the temperature prevailing within the catalyst tower. Ordinarily it may be sufficient to introduce these hydrocarbons at a temperature of around 90 to 100° F.

The proportion of the olefin-bearing hydrocarbon feed passing through the heater may comprise 80% by volume of the total charge, while the remaining 20% may be more or less equally divided between the pipes 17 and 18.

The reaction mixture comprising hydrocarbons and polymers is withdrawn from the bottom of the tower, either under its own pressure or by a pump 21, and passed through a pipe 22 to a fractionator 23, wherein the more volatile hydrocarbons are separated from the liquid polymers. The liquid polymers are drawn off from the bottom of the fractionator through a pipe 24 and may be subjected to such further treatment as desired. If desired, the material from the bottom of the catalyst tower may be passed first to a condenser or cooler and from there to an accumulator drum. The naphtha from this drum may then be passed to the stabilizer or fractionator.

The gaseous fraction removed from the top of the fractionator through a pipe 25 will comprise saturated hydrocarbons, non-polymerized olefins and, if desired, partially polymerized olefin hydrocarbons. This distillate fraction is passed through a condenser 26 to a receiving drum 27. A portion of the condensate may be returned through a pipe 28 to provide a reflux in the top of the fractionator 23. Gaseous constituents may be drawn off through a pipe 29.

A portion of the surplus condensate collecting in the receiver 27 may be drawn off by a pump 30 and passed through a pipe 31 communicating with pipes 32 and 33, by which means it is recycled through the polymerization tower. For example, the recycled hydrocarbons may be conducted, all or in part, to the inlet of the heater 13, wherein they are mixed with fresh feed passing through the heater and subsequently introduced at the top of the reaction tower.

On the other hand, the recycled hydrocarbons may pass through the pipe 33, which communicates with pipe 16, previously referred to. In this way the recycled hydrocarbons are passed through pipes 17 and 18 to intermediate points of the reaction tower.

The recycled hydrocarbons entering pipe 16 may be at a temperature suitable for introduction to the intermediate points of the tower without further cooling or heating, although if such is necessary, it may be accomplished by means of the exchangers 19 and 20, to which reference has been made previously. Where the recycled hydrocarbons are thus returned to intermediate points of the reaction tower it may be unnecessary to use any of the fresh hydrocarbon feed as a cooling medium. In such case, the entire fresh hydrocarbon feed passes through the heater 13.

During passage through the catalyst beds the initial volume of the feed hydrocarbons will be reduced, due to the formation of polymers and which reduction may be substantial where the hydrocarbon feed is rich in olefins. This reduction in volume is compensated for, however, by the introduction of feed or recycled hydrocarbons to the intermediate points of the tower. The proportion of hydrocarbons introduced at these intermediate points is thus regulated so as to maintain a substantially uniform velocity of hydrocarbons through each of the catalyst beds within the tower.

At low velocities there is a tendency for heavy polymers to accumulate on the active surface of the catalyst, thereby greatly decreasing the conversion efficiency of the catalyst material.

Increasing the velocity, with the resulting sweeping action, tends to maintain the catalyst in an active condition. On the other hand, excessive velocities may be undesirable, since the sweeping action is then so great that inadequate contact of the reacting materials with the catalyst would be obtained.

In actual operation the reaction tower 15 and the fractionator 23 are maintained under superatmospheric pressure. Thus, the pressure at the top of the reaction tower 15 may be around 700 pounds per square inch gauge.

As previously mentioned, it is advantageous to operate the reaction tower with a controlled temperature gradient; for example, the temperature at the bottom of the uppermost catalyst bed may be around 430° F., while sufficient cooling is applied to reduce the temperature at the top of the next bed to about 410° F. so that the temperature at the bottom of this second bed may be around 450° F. The temperature at the top of the third bed may be maintained at around 430° F., while the temperature at the bottom of that bed may be around 475° F. Thus, there will be an overall temperature differential through the tower of about 50 or 60° F.

As previously mentioned, it is desirable to regulate the water content of the entering hydrocarbons. Thus, provision may be provided for introducing a small amount of water to the heater inlet through a pipe 35 and to the pipes 17 and 18 through connections 36 and 37. For example, the water content of the hydrocarbons passing through the heater 13 may be around 0.3% by weight of the hydrocarbons. The water content of the hydrocarbons entering the tower through pipe 17 may be adjusted, for example, so that the water content of the combined hydrocarbon stream at that point within the tower will be around 1.5% by weight, while the water content of the hydrocarbons passing through pipe 18 may be adjusted so that the water content of the combined stream of hydrocarbons in the lower portion of the tower will be around 3% by weight.

The foregoing method of temperature and velocity control may be applied to any catalytic polymerization operation which is of exothermic character and which involves continuous removal of the polymerized material from the surface of the catalyst.

The invention may be applied with such catalysts as copper pyrophosphate, phosphoric acid disposed on activated carbon, and catalysts comprising silica and alumina, or combinations of catalytic agents, such as activated carbon and copper pyrophosphate, metallic oxides and pyrophosphates, etc.

It is contemplated, of course, that different catalysts will require different conditions of temperature, pressure and velocity of flow in order to realize optimum conditions.

In the foregoing description the feed to the polymerization unit has been described as the excess reflux condensate produced in the stabilization of cracked naphtha. It is contemplated that the feed stock may comprise an uncondensed gaseous fraction from the stabilizer accumulator drum 5. In this latter case the feed could be charged in gaseous form to the polymerization unit, or it may be compressed, cooled and condensed, and the condensate pumped as liquid to the polymerization unit.

This application is a division of application Serial No. 284,192, filed July 13, 1939, for improvements in Catalytic conversion of hydrocarbons.

Obviously many modifications and variations of the invention, as hereinbefore set forth, may be made without departing from the spirit and scope thereof, and therefore only such limitations should be imposed as are indicated in the appended claims.

I claim:

1. A continuous method for polymerizing normally gaseous olefins which comprises heating a stream of normally gaseous hydrocarbons containing about 20 to 40% olefins to a temperature in the range about 375 to 400° F., continuously introducing said feed stream in vapor phase to a reaction tower packed with a solid polymerization catalyst comprising phosphoric acid having a concentration of about 100 to 110% $H_3PO_4$ by weight of the acid, passing said feed stream through the reaction tower from inlet to outlet, effecting polymerization of olefinic constituents of the feed to normally liquid hydrocarbons during passage through the reaction tower from inlet to outlet, said polymerization being accompanied by reduction in volume of said feed stream advancing through the reaction tower, injecting streams of hydrocarbon gas to the reaction tower at a plurality of succeeding points in the direction of hydrocarbon flow through the tower, adjusting the amount of gas so injected to compensate for said reduction in volume and thus maintain a substantially uniform velocity of hydrocarbon flow throughout the reaction tower from inlet to outlet, introducing a small amount of water in the feed hydrocarbon stream passing to the inlet portion of the reaction tower, injecting additional amounts of water to the reaction tower at a plurality of succeeding points in the direction of hydrocarbon flow such that the water content of the combined hydrocarbon stream passing through the outlet portion of the reaction tower is about 3% and maintaining the reaction temperature within the tower below about 475° F.

2. A continuous method for polymerizing normally gaseous olefins which comprises heating a stream of normally gaseous hydrocarbons containing about 20 to 40% olefins to a temperature in the range about 375 to 400° F., continuously introducing said feed stream in vapor phase to a reaction tower packed with a solid polymerization catalyst comprising phosphoric acid having a concentration of about 100 to 110% $H_3PO_4$ by weight of the acid, passing said feed stream through the reaction tower from inlet to outlet, effecting polymerization of olefinic constituents of the feed to normally liquid hydrocarbons during passage through the reaction tower from inlet to outlet, said polymerization being accompanied by reduction in volume of said feed stream advancing through the reaction tower, injecting streams of hydrocarbon gas to the reaction tower at a plurality of succeeding points in the direction of hydrocarbon flow through the tower, adjusting the amount of gas so injected to compensate for said reduction in volume and thus maintain a substantially uniform velocity of hydrocarbon flow throughout the reaction tower from inlet to outlet, separately adjusting the temperature of said streams of gas passing to succeeding points in the reaction tower, and maintaining the reaction temperature within the reaction tower below about 475° F.

3. A continuous method for polymerizing normally gaseous olefins which comprises heating a stream of normally gaseous hydrocarbons containing about 20 to 40% olefins to a temperature in the range about 375 to 400° F., continuously introducing said feed stream in vapor phase to a reaction tower packed with a solid polymerization catalyst comprising phosphoric acid having a concentration of about 100 to 110% $H_3PO_4$ by weight of the acid, passing said feed stream through the reaction tower from inlet to outlet, effecting polymerization of olefinic constituents of the feed to normally liquid hydrocarbons during passage through the reaction tower from inlet to outlet, said polymerization being accompanied by reduction in volume of said feed stream advancing through the reaction tower, injecting streams of hydrocarbon gas to the reaction tower at a plurality of succeeding points in the direction of hydrocarbon flow through the tower, adjusting the amount of gas so injected to compensate for said reduction in volume and thus maintain a substantially uniform velocity of hydrocarbon flow throughout the reaction tower from inlet to outlet, introducing a small amount of water in the feed hydrocarbon stream passing to the inlet portion of the reaction tower, injecting additional amounts of water to the reaction tower at a plurality of succeeding points in the direction of hydrocarbon flow such that the water content of the combined hydrocarbon stream passing through the outlet portion of the reaction tower is about 3%, separately adjusting the temperature of said streams of gas passing to succeeding points in the reaction tower, and maintaining the reaction temperature within the reaction tower below about 475° F.

LEBBEUS C. KEMP.